US006510205B2

(12) United States Patent
Daimon et al.

(10) Patent No.: US 6,510,205 B2
(45) Date of Patent: Jan. 21, 2003

(54) INFORMING SYSTEM

(75) Inventors: Yoshitaka Daimon, Kawasaki (JP); Takashi Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/809,112

(22) Filed: Mar. 16, 2001

(65) Prior Publication Data

US 2001/0013109 A1 Aug. 9, 2001

Related U.S. Application Data

(63) Continuation of application No. PCT/JP99/05742, filed on Oct. 18, 1999.

(30) Foreign Application Priority Data

Nov. 17, 1998 (JP) .......................................... 10-326254

(51) Int. Cl.[7] ................................................ H04M 3/08

(52) U.S. Cl. ......................... 379/32.01; 379/33; 379/37

(58) Field of Search ............................. 379/37, 38, 43, 379/44, 32.01, 33; 714/10

(56) References Cited

U.S. PATENT DOCUMENTS 5,566,339 A * 10/1996 Perholtz et al. ............... 379/38
6,049,272 A * 4/2000 Lee et al. ................... 340/531
6,081,592 A * 6/2000 Battle .................... 379/265.05
6,141,412 A * 10/2000 Smith et al. ........... 379/265.14
6,263,049 B1 * 7/2001 Kuhn .................... 379/265.06
6,266,396 B1 * 7/2001 Johnson ....................... 379/37

FOREIGN PATENT DOCUMENTS

JP 3-250950 11/1991
JP 8-153294 6/1996
JP 8-314761 11/1996
JP 9-98222 4/1997
JP 9-168059 6/1997

* cited by examiner

*Primary Examiner*—Melur Ramakrishnaiah
*Assistant Examiner*—Barry W Taylor
(74) *Attorney, Agent, or Firm*—Staas & Halsey LLP

(57) ABSTRACT

An informing system is provided that informs an optimum person to be called of a failure when a failure occurs in an information processing system. The informing system includes operation monitoring means (13) for detecting a failure in the information processing system and for acquiring the failure situation, time monitoring means (17) for acquiring a failure time when the failure in the information processing system is detected by the operation monitoring means (13), device to-be-called lists (22, 23) having a record of the types of the device to be called that is used for calling and the priorities of call numbers corresponding to the failure situation and the failure time, list updating means (18) for updating the device-to-be-called list, and calling means (16) for searching the device-to-be-called list using the failure situation and the failure time as keys and for calling by determining the type of the device to be called and the call number.

13 Claims, 12 Drawing Sheets

Fig. 3

24 FIRST FAILURE DIVISION LIST

DIV1 CON

| DIVISION 1 | CONTENTS |
|---|---|
| A | AIR CONDITIONER |
| E | POWER SOURCE |
| M | COMPUTER |
| | |

Fig. 4

25 SECOND FAILURE DIVISION LIST

DIV2 CLA

| DIVISION 2 | MALFUNCTION CLASS |
|---|---|
| (M) 0 | COMPOSITE MALFUNCTION 0: HARDWARE, SOFTWARE AND APPLICATION |
| (M) 1 | COMPOSITE MALFUNCTION 1: HARDWARE AND SOFTWARE |
| (M) 2 | COMPOSITE MALFUNCTION 2: HARDWARE AND APPLICATION |
| (M) 3 | COMPOSITE MALFUNCTION 3: SOFTWARE AND APPLICATION |
| (M) 9 | SINGLE MALFAUNCTION |
| | |

Fig. 6

26 OPERATING KEY TABLE

| | | | | |
|---|---|---|---|---|
| 0= NOT ADVANCED | 1=ADVANCED IF WITHIN 10 MINUTES | 2=ADVANCED IF WITHIN 20 MINUTES | 3=ADVANCED IF WITHIN 30 MINUTES | |

Fig. 7

20 ROTA

FSC ROTA FROM SUN. 2/1/98 THROUGH SAT. 2/7/98

SE ROTA FROM SUN. 2/1/98 THROUGH SAT. 2/7/98

CE ROTA FROM SUN. 2/1/98 THROUGH SAT. 2/7/98 (PRIORITIES ①, ②)

| TIME ZONE | SUN. 1 | MON. 2 | TUE. 3 | WED. 4 |
|---|---|---|---|---|
| 8:00 ~17:00 | ①KITANO | CENTER | CENTER | CENTER |
| 17:00 ~19:00 | ②ONO | ①ONO ②KITANO | ①KITANO②ONO | ①ONO ② |
| 19:00 ~ 0:00 | ①NAKANISHI | ①NISHIKAWA ②KANDA | ①TSUJIMURA ②UMEMOTO | ①NAKA-NISHI ② |
| 0:00 ~ 8:00 | ②YONEYAMA | ①KANDA ②NISHIKAWA | ①UMEMOTO ②TSUJIMURA | ①YONEYAMA ② |

Fig. 10

23 CENTER DEVICE-TO-BE-CALLED LIST

FSC/CENTER DEVICE-TO-BE-CALLED LIST

SE/CENTER DEVICE-TO-BE-CALLED LIST

CE/CENTER DEVICE-TO-BE-CALLED LIST (PRIORITY (1)①-(3)③)

| TIME ZONE | (1) PERSONAL COMPUTER | (2) TELEPHONE | (3) FACSIMILE |
|---|---|---|---|
| 8:00-17:00 IN WORKING DAY | ①111.111.P11 ②111.111.P12 ③111.111.P13 | ①06-949-TT11 ②06-949-TT12 ③06-949-TT13 | ①06-949-FF11 ②06-949-FF12 ③06-949-FF13 |

FIG. 11

27a URGENT REPRESENTATIVE LIST

NUM OPE TUR DUT AUT (CURRENT TIME:18:10, 02/02 1998)

| | | CE | | | SE | | |
|---|---|---|---|---|---|---|---|
| NUMBER OF DEVICE | OPERATOR | TOUR | DUTY TYPE | AUTOMATIC CALL | TOUR | DUTY TYPE | |
| # 1 | MATSUI, WADA | ①ONO | INSIDE WORK | ①111.111.P11 (PERSONAL COMPUTER)<br>②06-949-TTT1 (TELEPHONE)<br>③06-949-FFF1 (FACSIMILE) | | | |
| # 2 | KIYOHARA, SINJYO | ②KITANO | INSIDE WORK | ①111.111.P12 (PERSONAL COMPUTER)<br>②06-949-TTT1 (TELEPHONE)<br>③06-949-FFF2 (FACSIMILE) | | | |
| # 3 | HIROSAWA | | | | | | |

(A)

27b URGENT REPRESENTATIVE LIST

NUM OPE TUR DUT AUT (CURRENT TIME:21:35, 02/02 1998)

| | CE | | | SE | | |
|---|---|---|---|---|---|---|
| NUMBER OF DEVICE :OPERATOR | TOUR | DUTY TYPE | AUTOMATIC CALL | TOUR | DUTY TYPE | |
| # 1 : MATSUI, WADA<br># 2 : KIYOHARA, SHINJYO<br># 3 : HIROSAWA | ①NISHIKAWA | STANDBY | ①030-KKK-KK4 (MOBILE) | | | |
| | ②KANDA<br>②KANDA | STANDBY<br>STANDBY | ①030-KKK-KK5 (MOBILE)<br>②0720-66-DDD1 (TELEPHONE) | | | |

(B)

INFORMING SYSTEM

This application is a continuing application, filed under 35 U.S.C. §111(a), of International Application PCT/JP99/05742, filed Oct. 18, 1999, it being further noted that priority is based upon Japanese Patent Application 10-326254, filed Nov. 17, 1998.

FIELD OF THE INVENTION

The present invention relates to an informing system for directing an appropriate maintenance person in a short time to an apparatus that is in an abnormal state when an abnormal condition occurs in a large-scale information processing system that is used in a facility requiring relative urgency such as a hospital, a care center for the old, a computer center or a security guard company.

The information processing system usually works continuously day and night. If an abnormal condition occurs in the information processing system, it is necessary to recover promptly even if it is midnight, since the abnormal condition may cause a large loss. It is important for the prompt recovery to contact with a suitable maintenance person quickly in accordance with the abnormal condition of the information processing system. Therefore, a development of an informing system has been desired for informing a maintenance person quickly as well as certainly of an abnormal condition in an information processing system.

The present invention relates to a communication controlling method, a terminal and a recording medium for caller ID information. Particularly, the present invention is used for a modem that can support the caller ID information service so that plural terminals connected to a telephone line can receive a call with the caller ID information from the telephone line without a contention.

DESCRIPTION OF THE PRIOR ART

Conventionally, various informing systems have been proposed as an informing system for informing of an abnormal condition of an information processing system. For example, Japanese unexamined patent publication No. 8-314761 discloses a system setting responsible groups corresponding to abnormal conditions in an information processing system, setting priorities of plural persons to be called in the responsible group and a device to be called that is used for calling each person to be called, informing a person to be called by the device to be called in accordance with the priorities when an abnormal condition occurs, and informing another person of the next priority if there is no response.

However, in the conventional informing system, the setting is fixed concerning the person to be called, the priority of the person to be called and the device to be called for calling each person to be called. Therefore, though a person to be called is assigned corresponding to a day of the week and a time zone in the responsible group actually, the person having the highest priority in the responsible group is called. As a result, there is a waste in that the person having the highest priority is temporarily informed and then communicates with a proper person to be called who is assigned to the day of the week and the time zone.

In addition, since the information processing system usually works 24 hours, a person to be called who is assigned to the highest priority may be called at midnight or in a holiday and has to be always tense.

Moreover, since the setting of the device to be called and the setting of call number are fixed as explained above, even if there are different apparatuses by which the person to be called wishes to be informed in accordance with the time zone, only a preset specific device to be called is informed. For example, when the person wishes to be informed by a telephone on a desk during office hours and by a mobile phone after the hours, the undesired mobile phone may be informed during office hours if the mobile phone is set as the device to be called.

SUMMARY OF THE INVENTION

An object of the present invention is to provide an informing system that can quickly inform an optimum person to be called of a failure, if any failures occur in an information processing system by informing a device to be called that is assigned to the time zone, efficiently and without a waste.

A system according to the present invention is an informing system for informing of a failure using a communication line, when a failure occurs in an information processing system (a main system) 11. The informing system comprises operation monitoring means 13 for detecting a failure in the information processing system 11 and for grasping the failure situation, time monitoring means 17 for acquiring a failure time when the failure of information processing system 11 detected by the operation monitoring means 13 occurs, device-to-be-called lists 22, 23 containing the types of devices to be called and the priorities of the call numbers used for calling in accordance with the failure situation and the failure time, list updating means 18 for updating the device-to-be-called lists 22, 23, and calling means 16 for searching the device-to-be-called lists 22, 23 using the failure situation and the failure time as keys and for calling by designating the type and the call number of the device to be called.

The informing system according to the present invention can be located in the place where the information processing system 11 is located, in the vicinity of the place, or at a distance from the place.

BRIEF DESCRIPTION OF THE DRAWINGS

FIG. 3 is a diagram showing an example of a first failure division list.

FIG. 4 is a diagram showing an example of a second failure division list.

FIG. 6 is a diagram showing an example of an operating key table.

FIG. 7 is a diagram showing an example of a rota.

FIG. 10 is a diagram showing an example of a center device-to-be-called list.

FIG. 11 is a diagram showing an urgent representative list.

DESCRIPTION OF THE PREFERRED EMBODIMENTS

Figure 1:
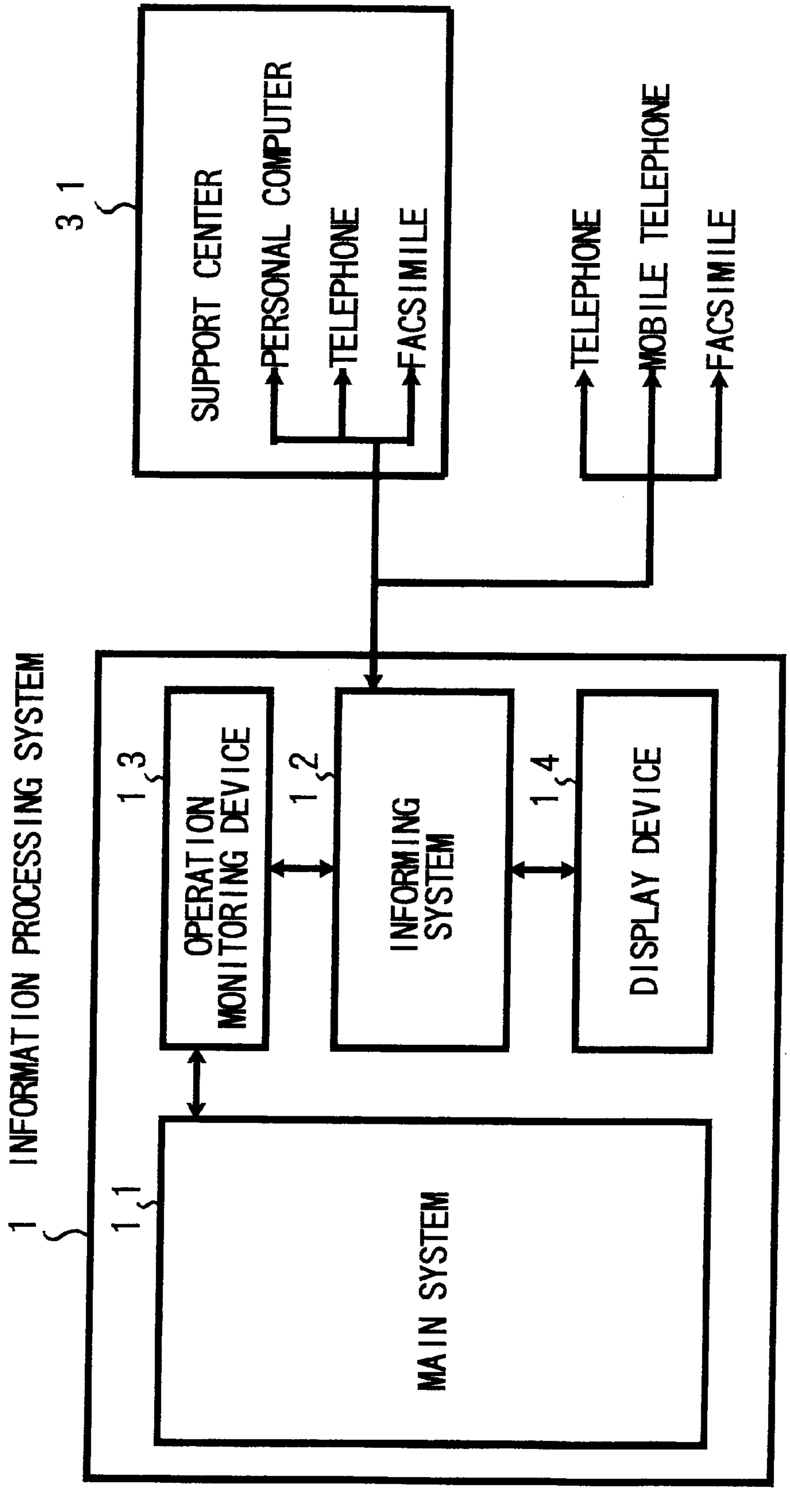
FIG. 1 is a block diagram showing an entire structure of an information processing system including an informing system according to the present invention.

In FIG. 1, the information processing system 1 includes a main system 11, an informing system 12, an operation monitoring device 13 and a display device 14. The informing system 12 can be connected to a personal computer, a telephone, a facsimile or other equipment of a support center 31 via a private line, a digital public line, a telephone line or other lines. The informing system 12 can be also connected to a private telephone, a private facsimile, a private mobile telephone or other equipment via those lines.

The main system 11 is an information processor such as a large scale computer and is installed in e.g., a hospital, a care center for the old, a security guard company or a computer center for operation. The main system 11 corresponds to the information processing system in the present invention.

The operation monitoring device 13 always monitors the main system 11, detects a failure if occurs, and outputs information showing the failure situation (referred to as a "failure situation" in this specification) to the informing system 12. The failure situation is classified by a failure division DIV and a failure code COD. The failure division DIV is classified by the first failure division list 24 shown in FIG. 3 and by the second failure division list 25 shown in FIG. 4. The failure codes COD are classified by the failure code list 19 shown in FIG. 5.

In the first failure division list 24 shown in FIG. 3, the failure division DIV1 is divided by failure contents CON. In this embodiment, the failure contents CON contain three types of failures, i.e., a failure related to an air conditioner, a failure related to a power source and a failure related to a computer. The three failures are denoted with "A", "E" and "M", respectively.

In the second failure division list 25 shown in FIG. 4, the failure division DIV2 is divided by a failure malfunction class CLA. In this embodiment, the malfunction class CLA contains a composite malfunction "0" of hardware, software and application, a composite malfunction "1" of hardware and software, a composite malfunction "2" of hardware and application, a composite malfunction "3" of software and application, and a single malfunction "9".

For example, if the failure is related to a computer and the malfunction is a composite malfunction of hardware and software, the failure division DIV is signified with "M1". The software here means an operating system.

Figure 5:
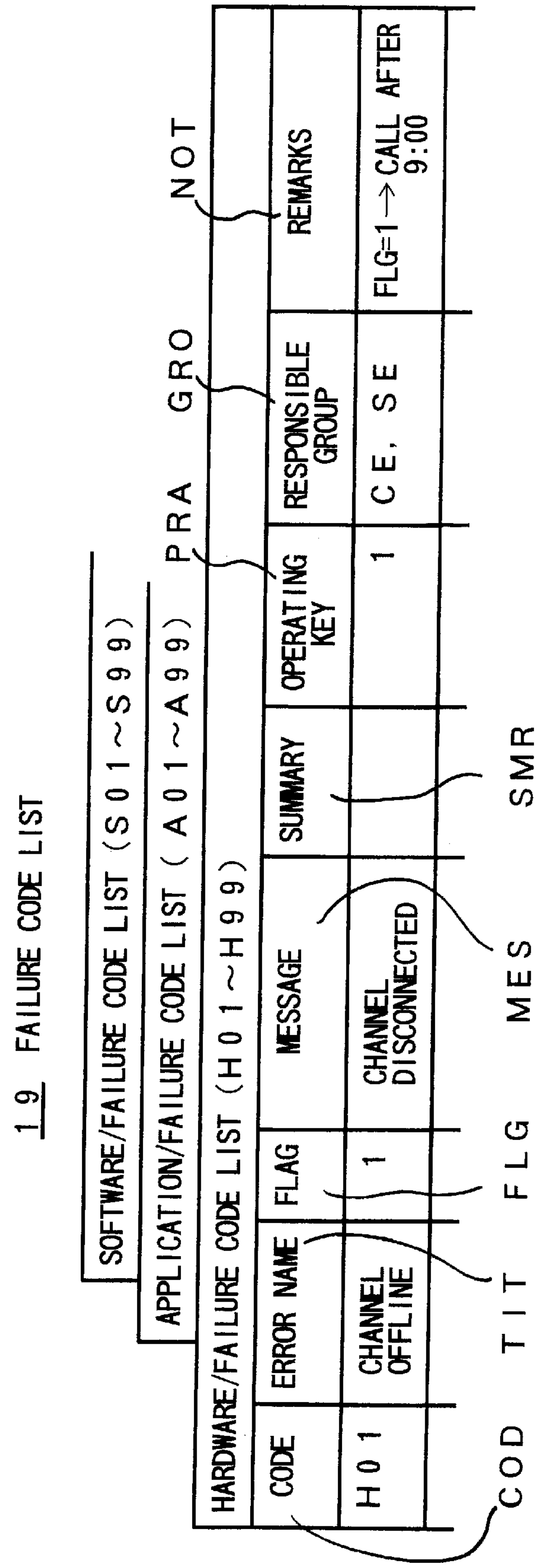
FIG. 5 is a diagram showing an example of a failure code list.

The failure code list 19 shown in FIG. 5 is divided into three lists in accordance with a cause of the failure or a place of the failure; the three types include a failure of a hardware system (H01-H99), a failure of a software system (S01-S99), and failure of an application system (A01-A99). These lists can be combined into one failure code list.

The failure code list 19 contains item fields of an error name TIT, a flag FLG, a message MES, a summary SMR, an operating key PRA, a responsible group GRO and remarks NOT corresponding to a code (a failure code) COD.

The error name TIT is a concrete name or symptom of a failure, whose detail explanation is recorded in the fields of the message MES and the summary SMR.

The flag FLG indicates whether there is a time designation at the time of calling. For example, if the flag FLG is set "1", there is a time designation, whose contents is "a call after nine" (a call will be performed as recorded in the remarks NOT). The time designation is usually performed when a failure of the error name TIT is not urgent, and a failure can be handled if a person to be called is informed of the occurrence of the failure.

The operating key PRA is used for advancing the failure time so as to call a person to be called of the next time zone when a failure occurs remaining short time until an exchange of a person to be called who is exchanged every time zone. Namely, if the remaining time of the person is short, it is more practical to call a person of the next time zone rather than calling the former person.

In the responsible group GRO for maintenance, a group is set that is to handle the failure.

In the operating key table 26 shown in FIG. 6, information of this advanced time are recorded. A value recorded in the operating key PRA of the failure code list 19 is used as a key for searching the operating key table 26, and an operating method about the advanced time is acquired. In accordance with the acquired operating method, a person to be called is called.

Referring to FIG. 1, on the screen of the display device 14, an informing situation of the informing system 12 or a monitoring situation for informing is displayed. Specifically, for example, an "urgent representative list" is displayed on the screen during the normal operation of the main system 11, while an "urgent automatic call situation" is displayed on the screen when a failure occurs in the main system 11.

FIG. 11(A) shows an example of the display of the urgent representative list 27*a* at 6:10 p.m., and FIG. 11(B) shows an example of the display of the urgent representative list 27*b* at 9:35 p.m.

As shown in FIGS. 11(A) and 11(B), the urgent representative lists 27*a*, 27*b* contains a computer number NUM if the user main system 11 includes plural computers, a current operator name OPE, a tour (a name of a person to be called) TUR of each responsible group for responding an emergency, priorities thereof, a duty type DUT, a type of a device to be called that is used for calling a person to be called, a call number, and priorities thereof, and these items are displayed on the screen of the display device 14. The contents of the display, as understood by comparing FIG. 11(A) with FIG. 11(B), are automatically updated every exchange of a person to be called for each time zone.

Figure 12:
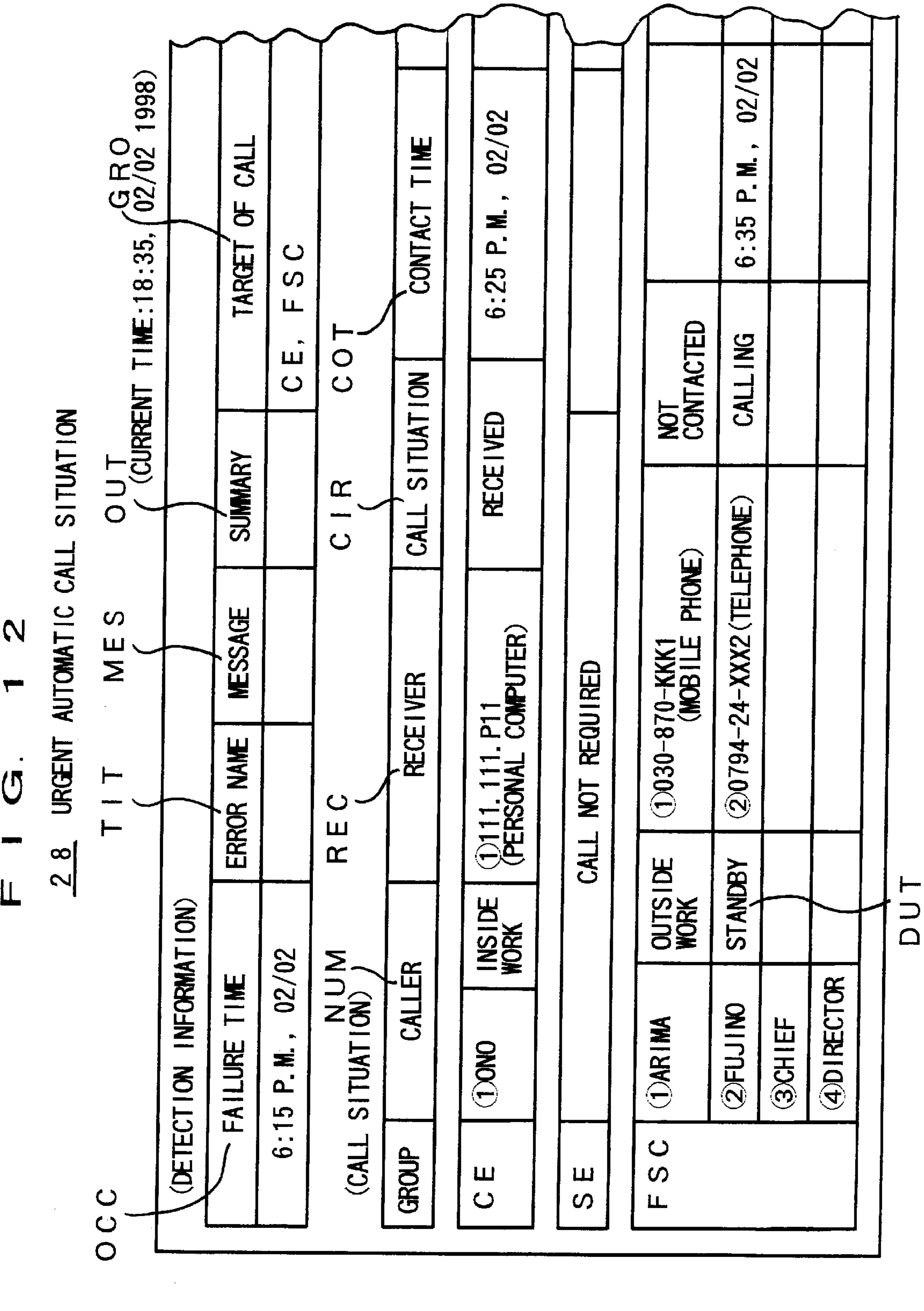
FIG. 12 is a diagram showing an urgent automatic call situation. p

As shown in FIG. 12, the urgent automatic call situation 28 contains a date and a time OCC when a failure occurred, the above-mentioned error name TIT, the message MES, the summary SMR, a detection information including a target of call (a responsible group) GRO indicating a responsible group name to be called, names of persons to be called, priorities thereof, a duty type DUT, a call situation CIR, a contacting time COT thereof, a type of device to be called that is used for calling a person to be called, and a call situation including a call number, and these items are displayed on the screen of the display device 14.

The call situation CIR and the contacting time COT thereof are displayed as received when a contact with a person to be called is succeeded, and the time thereof is displayed. If the contact is not succeeded after a predetermined number of calls, the display is "failure in contact", and a person to be called having the next priority is called while "calling" is displayed. The contacting time COT displayed at that time is the current time.

The display device 14 is usually installed in the operating room of the main system 11, but can be installed in the support center or other place not limited to the operating room, or can be installed in plural places.

The support center 31 is a hub for support and maintenance of the main system 11, and a person to be called (a responsible person) always stays there. The support center 31 is connected to the informing system 12 via the communication line and is equipped with a device to be called such as a personal computer, a telephone and a facsimile for receiving a call from a calling device 16.

Figure 2:
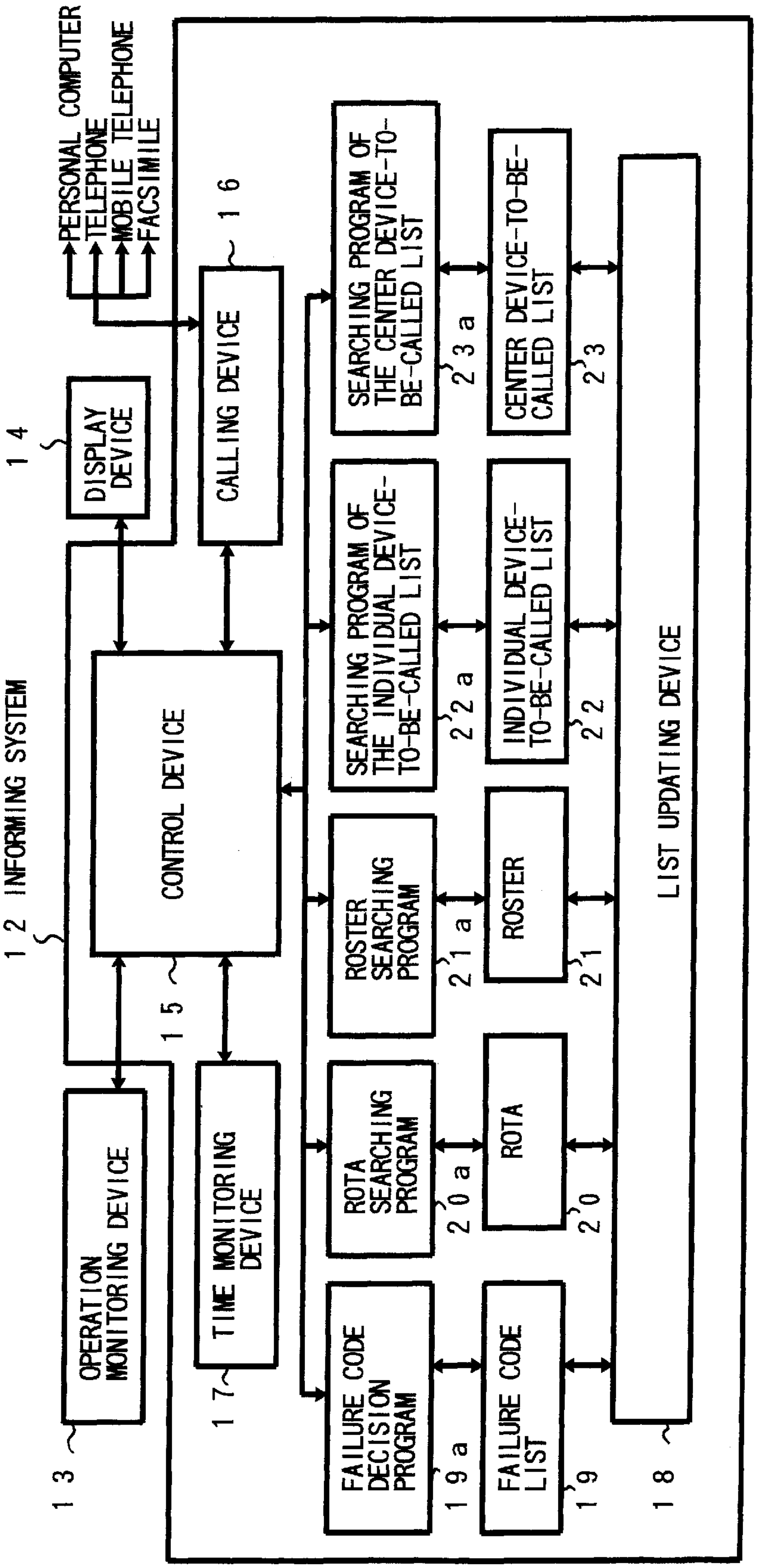
FIG. 2 is a block diagram showing the structure of the informing system according to the present invention.

In FIG. 2, the informing system 12 includes a control device 15, the calling device 16, a time monitoring device 17 and a memory device. The memory device stores the failure code list 19, a failure code decision program 19*a,* the rota 20, a rota searching program 20*a,* the roster 21, a roster searching program 21*a,* the individual device-to-be-called list 22, a searching program of the individual device-to-be-called list 22*a,* the center device-to-be-called list 23, a searching program of the center device-to-be-called list 23*a,* and other various programs, tables and data. Though not shown in figures, the memory device stores the first failure division list 24, the second failure division list 25 and the operating key table 26 as a part of data or a program. A list updating device 18 updates contents of the lists stored in the memory device, and the function thereof is realized by execution of a program.

The informing system 12 is realized by a personal computer or a workstation having a multimedia function. The informing system 12 can be also realized by a network system thereof.

The control device 15 generally controls the entire informing system 12. The control device 15 acquires the failure divisions DIV1, DIV2, and the failure code COD from an external operation monitoring device 13 when a failure occurs and acquires data of the date and the time OCC at the occurrence of the failure from the time monitoring device 17. In accordance with the acquired data of the failure divisions DIV1, DIV2, the failure code COD, the date and the time OCC, the control device 15 controls various programs to search various lists and controls the calling device 16 to call the person to be called corresponding to the acquired data with the device to be called and the call number corresponding to the acquired data. If there is no response after a predetermined number of calls, the call is performed in the order of the device to be called and the call number having the next priority. If there is still no response, a person to be called having the next priority is called.

Moreover, the control device 15, as explained above, displays the "urgent representative list" on the screen of the display device 14 during normal operation and displays the "urgent automatic call situation" when a failure occurs.

The calling device 16 calls the telephone number if the device to be called is a telephone, a mobile telephone or a facsimile and calls the address if the device to be called is a personal computer, in accordance with an instruction of the control device 15. The number of calls to be performed for one device to be called is preset, and if there is no response during the preset number of calls, a device to be called having the next priority and the person to be called having the next priority are called as explained above.

Concerning confirmation of response, if the device to be called is any one of telephone, mobile telephone and personal computer, the person to be called returns a confirmation signal that is determined previously. For example, a person who was called pushes a dial button such as "0" or "#" in the case of a telephone or a mobile telephone, or inputs "OK" in the case of a personal computer. If the device to be called is a facsimile, the "transmission completion" is regarded as a response. However, reconfirmation is performed with caution by making the person to be called telephone a predetermined number. The calling device 16 itself is conventionally known as an automatic calling device.

The time monitoring device 17 transmits a time (the date and the time OCC) when the control device 15 received the failure situation from the operation monitoring device 13 as a current time to the control device 15. The control device 15 keeps the current time. The current time becomes a reference date and a time for ensuing call to a person to be called.

The list updating device 18 is a device for changing data of the failure code list 19, the rota 20, the roster 21, the individual device-to-be-called list 22 and the center device-to-be-called list 23 as necessity. The data of these lists, especially the data of the person to be called in the roster 21 can be changed due to a sudden illness or a sudden trip of the person to be called, or other reason. Moreover, data of the device to be called of the individual device-to-be-called list 22 and the center device-to-be-called list 23 can be changed due to a malfunction of the device to be called or a condition of the person to be called. Therefore, data of these lists can be updated occasionally if necessary. When updating the list, a screen picture for updating is displayed, in which revised data are inputted. In addition, the revised entire list can be inputted for updating. The updating is mainly performed in the support center, but can be performed by operating a personal computer that is connected to the informing system 12.

The list updating device 18 can keep data of these lists as the latest data, so that calling to a person to be called can be achieved in the shortest time at the occurrence of the failure.

The failure code list 19, as explained above, has a record of data corresponding to the failure code COD obtained from the operation monitoring device 13. Namely, corresponding to each failure code COD, there are item fields such as an error name, a FLG, a message, a summary, an operating key, and remarks. The failure code decision program 19*a* decides the responsible group GRO in accordance with the contents recorded corresponding to each failure code COD.

As shown in FIG. 7, the rota 20 has a record of the persons to be called and the priorities thereof in accordance with the failure code COD obtained from the failure situation and with the time zone of the date and the time OCC. The responsible group GRO is determined corresponding to a cause of a failure or a place of a failure. A hardware malfunction (H) is handled by a customer engineer department (hereinafter referred to as "CE"), a software malfunction (S) is handled by a support center (hereinafter referred to as "FSC"), and an application malfunction (A) is handled by a system engineer department (hereinafter referred to as "SE").

The rota 20 is prepared for each department and is divided into divisions for each date and each time zone. Each division has a record of two persons to be called or centers in the order of the priority. The center means the support center, which is called instead of a person when a failure occurs in the normal office time zone of a weekday. In addition, the number of the persons to be called in each division can be one or three not limited to two.

The rota searching program 20*a* searches the person to be called corresponding to the failure situation and the date and the time OCC for determination.

Figure 8:
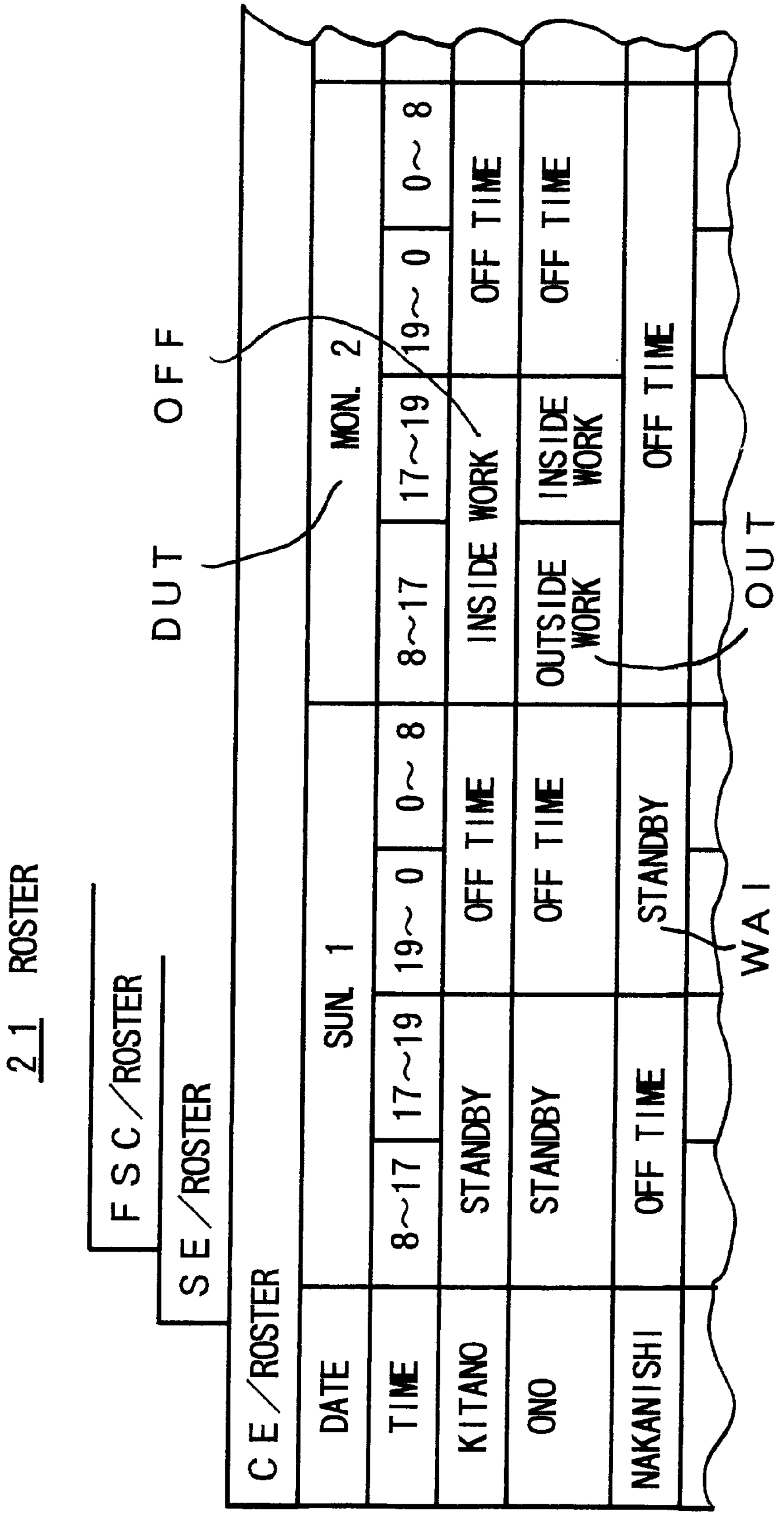
FIG. 8 is a diagram showing an example of a roster.

As shown in FIG. 8, the roster 21 has a record of a duty type DUT of the person to be called corresponding to the date and the time. The roster 21 is prepared for each department mentioned above, and the duty type DUT is recorded for each person to be called and for each date and the time zone.

In the duty type DUT, an inside work OFF means a normal work in the support center or the normal working department. An outside work OUT means a normal work except for in the support center or in the normal working department, including a business trip. A standby WAI means waiting in the support center or the normal working department in the unsocial hours such as on Sundays or on holidays. An off time means a state completely off the work, i.e., a time zone when calling is not performed.

The roster 21 is the converted result of data of the normal roster that is used everyday. The data of the normal roster is converted appropriately as necessity. Therefore, when updating the normal roster, data of the roster 21 are also updated along with the normal roster, and the contents of the roster 21 are identical to the actual duty type. Furthermore, the roster 21 can be prepared for the all departments instead of preparing for each department.

The roster searching program 21*a* searches the duty type DUT of the person to be called corresponding to the date and the time OCC for determination.

Figure 9:
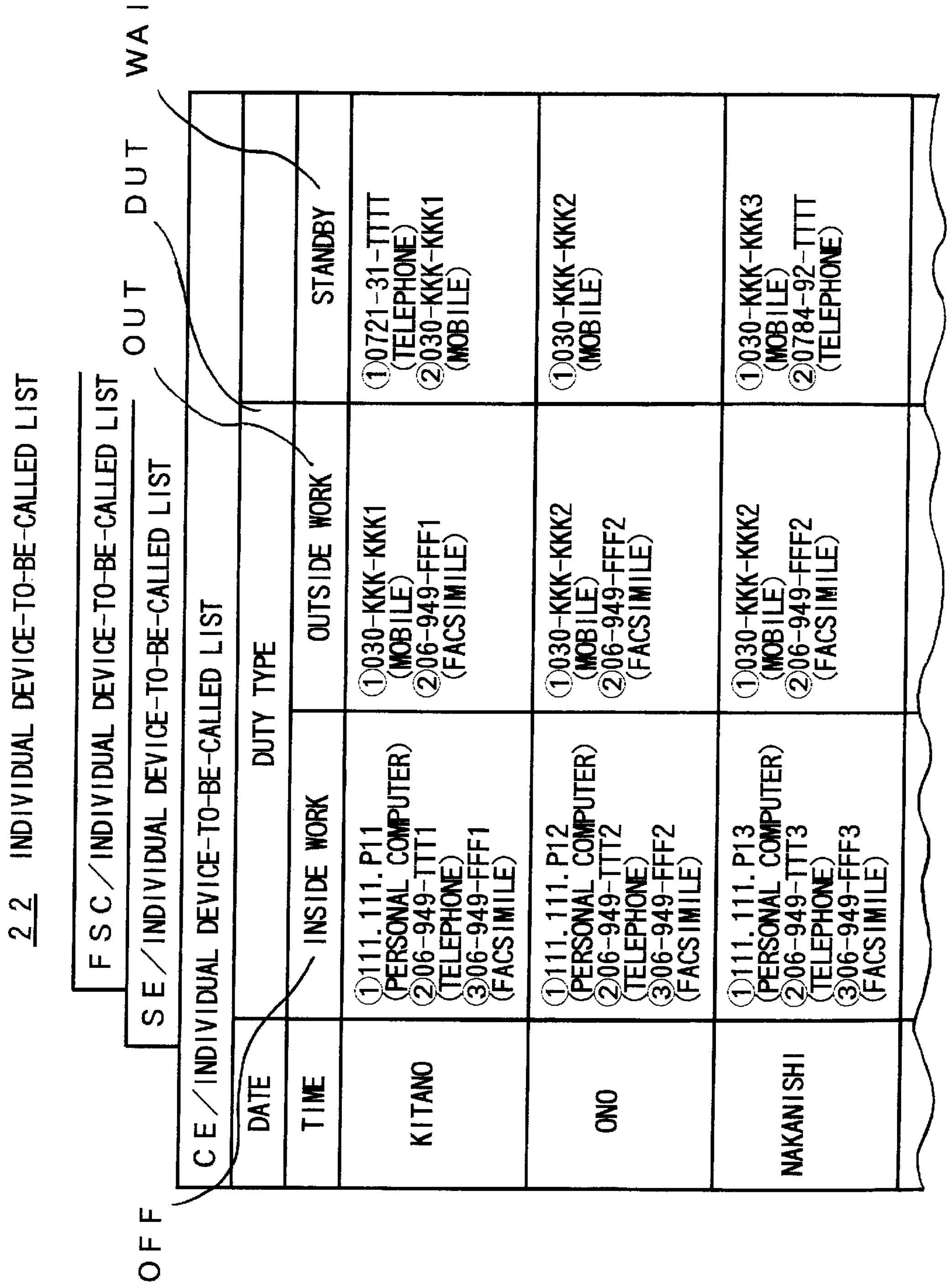
FIG. 9 is a diagram showing an example of an individual device-to-be-called list.

As shown in FIG. 9, the individual device-to-be-called list 22 has a record of the types of the device to be called that is used for calling corresponding to the duty type DUT of the person to be called and the priorities of the call number.

The individual device-to-be-called list 22 is prepared for each department explained above. The individual device-to-be-called list 22 is divided into divisions for each name of the person to be called and the duty type DUT, and each division has a record of the type of the device to be called that is used for calling each person to be called and the call number in the order of the priorities.

The duty type DUT is divided into the inside work OFF, the outside work OUT and the standby WAI as mentioned above, and each of them has a record of the device to be called. Concerning the off time, there is no record.

The types of the device to be called contain a personal computer, a telephone, and a mobile (a mobile telephone) and a facsimile. An address number is recorded for the personal computer, a telephone number is recorded for the telephone, the mobile and the facsimile, respectively as the call number.

The searching program of the individual device to be called 22*a* searches the type of the device to be called corresponding to the name of the person to be called and the duty type DUT and the call number for determination.

As shown in FIG. 10, the center device-to-be-called list 23 has a record of priorities of each type of the device to be called in the support center 31 in the normal work time zone of a working day, the call number thereof and the priorities of the call number.

The center device-to-be-called list 23 is prepared for each department mentioned above. The center device-to-be-called list 23 is divided into divisions for each type of the device to be called, and each division has a record of the call numbers in the order of the priorities.

The priorities of the type of the device to be called are determined in the order of a personal computer, a telephone (including a mobile phone) and a facsimile, and plural call numbers having priorities for each type is recorded. Concerning the order of calling, the first order of the call number of the personal computer that has the first order of the type is called. If there is no response, the second order of the call number is called, followed by the lower orders of the call number. After that, if there is no response, the first order of the call number of the telephone (including a mobile phone) that has the second order of the type is called, followed by the lower orders of the call numbers. Then, if there is still no response, the first order of the call number of the facsimile that has the third order of the type is called.

The center device to be called searching program 23*a* searches the call number corresponding to the type of the device to be called for determination.

Next, the process of the informing system 12 when a failure occurs in the main system 11 will be explained with reference to a flowchart.

Figure 13:
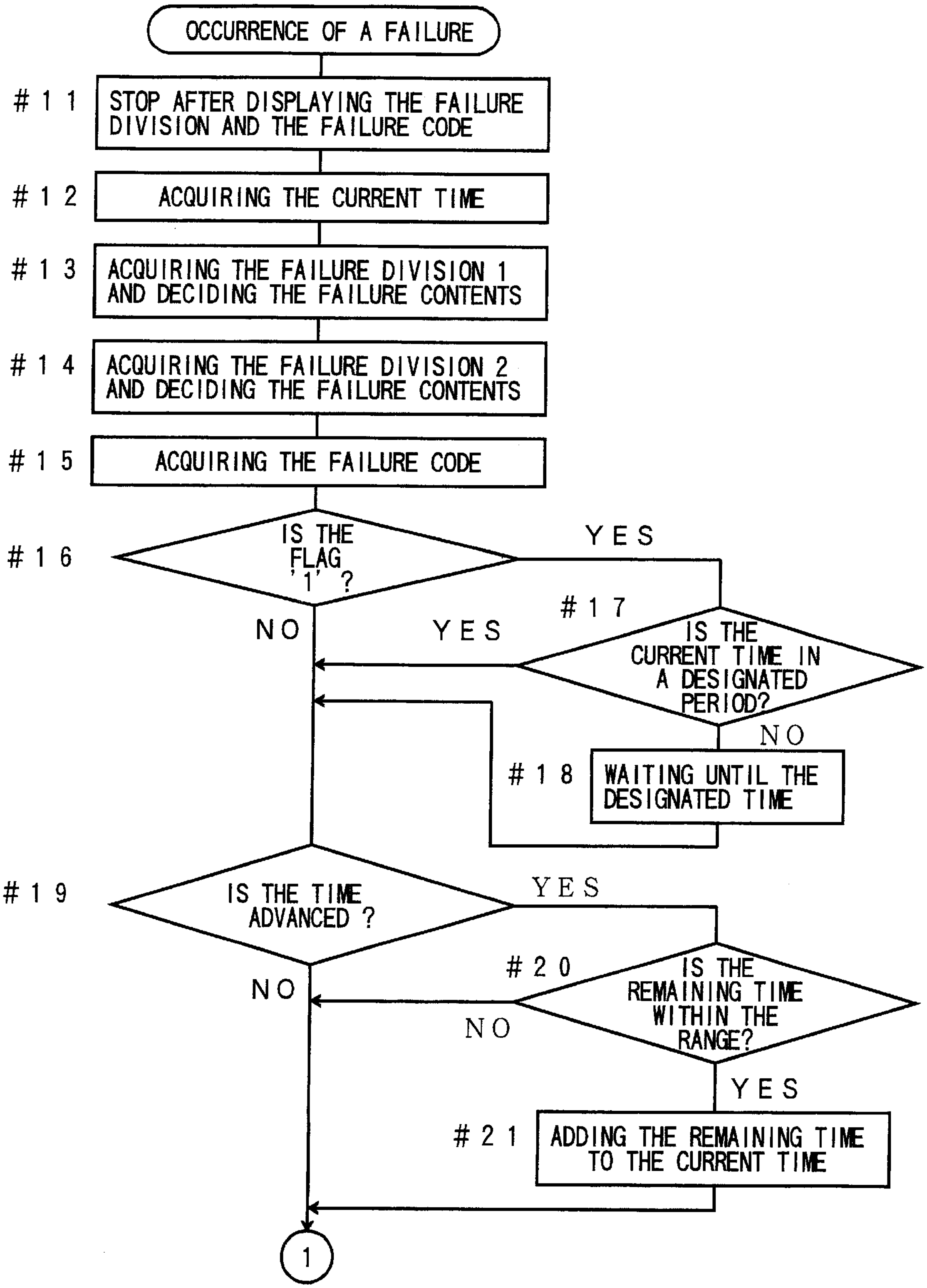
FIG. 13 is a flowchart for explaining a process of the informing system when a failure occurs.
Figure 14:
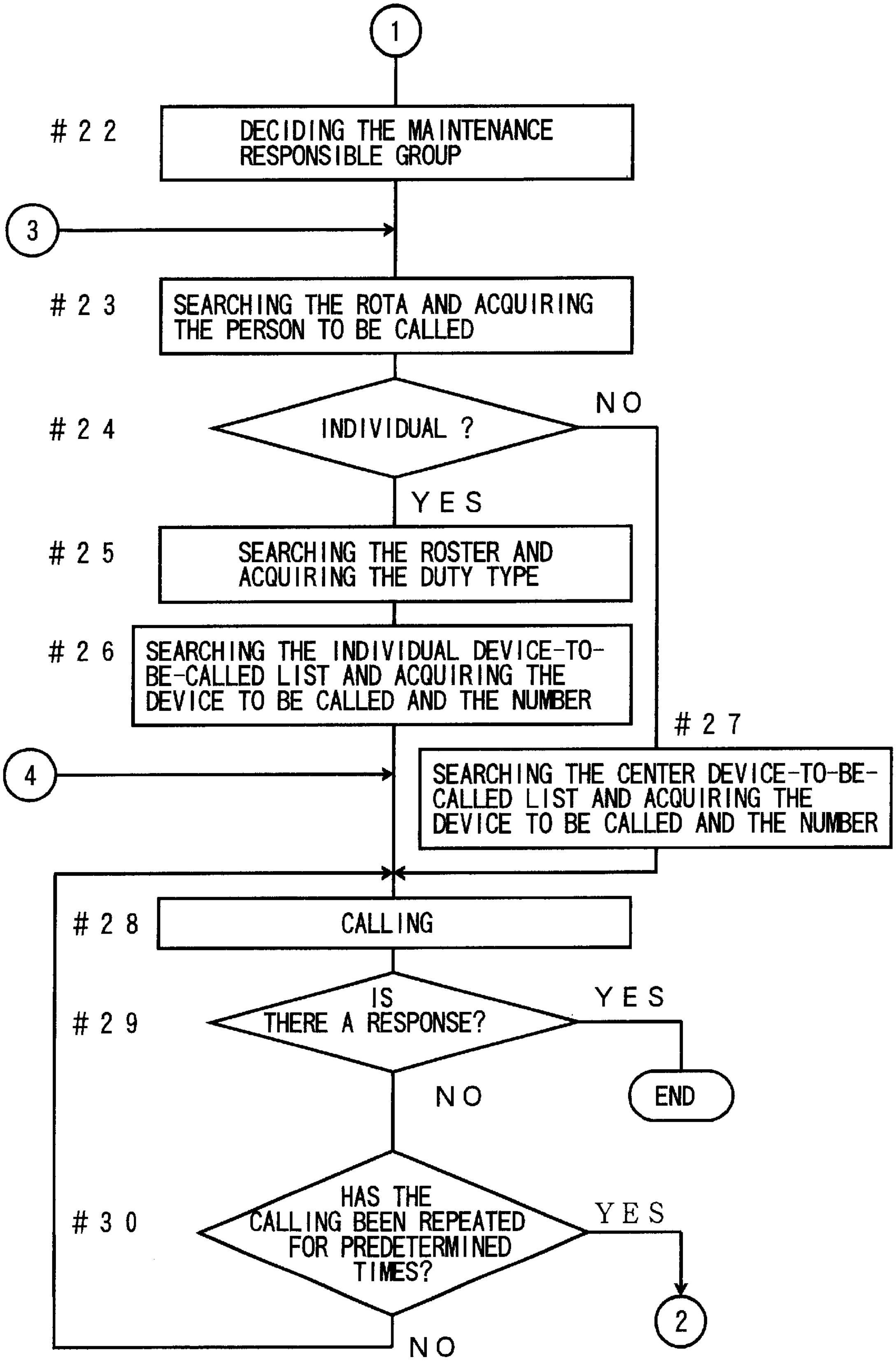
FIG. 14 is a flowchart for explaining a process of the informing system when a failure occurs.
Figure 15:
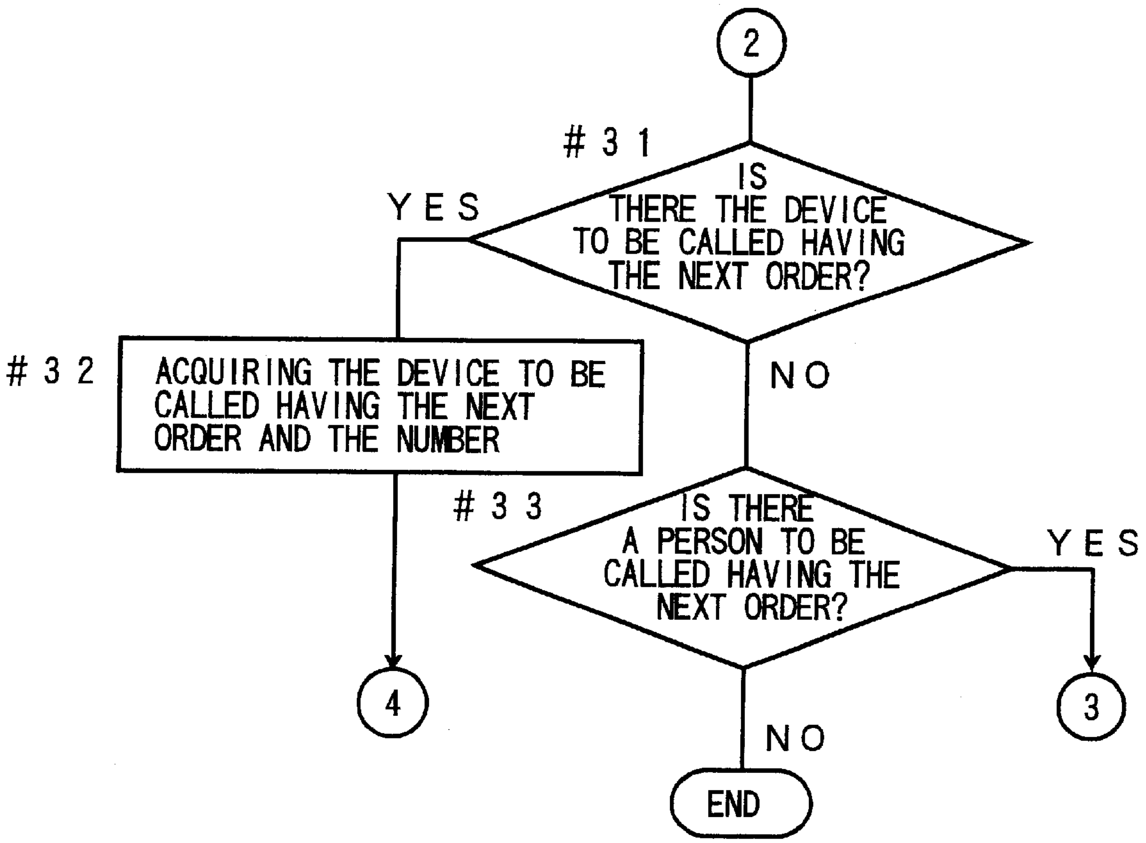
FIG. 15 is a flowchart for explaining a process of the informing system when a failure occurs.

FIGS. 13–15 are flowcharts for explaining the process of the informing system 12 when a failure occurs.

In FIGS. 13–15, when a failure occurs in the main system 11, the main system 11 displays the failure divisions DIV1, DIV2 and the failure code COD, and stops (#11).

The control device 15 knows the occurrence of a failure by the operation monitoring device 13 that detected the failure, and acquires the date and the time OCC as the current time from the time monitoring device 17 (#12).

The control device 15 acquires the failure division from the operation monitoring device 13, so as to decide the failure contents in accordance with the failure division DIV1 (#13). Moreover, the control device 15 decides the malfunction class CLA in accordance with the failure division DIV2 (#14). Then, the control device 15 acquires the failure code COD from the operation monitoring device 13 (#15) and decides whether the flag FLG corresponding to the failure code COD is “1” or not (#16).

If the flag FLG is “1” (Yes in #16), the control device 15 decides whether the current time is in a designated period (#17). If the current time is not in the designated period or not (No in #17), the control device 15 waits until the designated time (#18).

In the cases where the flag FLG corresponding to the failure code COD is not “1” (No in #16) and where the current time is in the designated period (Yes in #17) and after waiting until the designated time (#18), the control device 15 searches the operating key table 26 using the operating key PRA corresponding to the failure code COD so as to decide whether the time is advanced or not (#19).

If the operating key PRA is except for “0” and the time is advanced (yes in #19), it is decided whether the remaining time until the exchange of the responsible person is within the advanced time (#20). If the remaining time until the exchange of the responsible person is within the advanced time (Yes in #20), the remaining time until the exchange of the responsible person is added to the current time so as to make a new current time (#21). Then, the maintenance responsible group GRO corresponding to the failure code COD is decided in accordance with the failure code list 19 (#22).

In the following explanation, both the current time to which the remaining time until the exchange is not added in the case of no in the step #19 or #20 and the new current time to which the remaining time until the exchange is added in the case of yes in the step #20 are referred to as a “current time for searching.”

Using the current time for searching, the rota 20 corresponding to the maintenance responsible group GRO is searched so that the person to be called having the first order is acquired (#23). It is decided whether the person to be called is an individual or not (#24). If the person to be called is an individual (yes in #24), each roster 21 is searched by using the current time for searching, so that the duty type DUT of the person to be called is acquired (#25). Using the duty type DUT of the person to be called, each individual device-to-be-called list is searched, so that the type of the device to be called having the first order and the call number are acquired (#26).

If the person to be called is a center (No in #24), the center device-to-be-called list is searched, so that the type of the device to be called having the first order and the call number are acquired (#27). The acquired type of the device to be called having the first order and the call number are used for calling (#28). If there is a response (Yes in #29), the calling is finished.

If there is no response (No in #29), the number of calling times is decided (#30). If the number of the calling times is less than a predetermined value (No in #30), calling is repeated until the number of the calling times reaches the predetermined value (#28–#30).

If there is no response after the repeated calling of the predetermined times (Yes in #30), it is decided whether there is a type of the device to be called having the next order and the call number (#31). If there is a type of the device to be called having the next order and the call number (Yes in #31), the type of the device to be called having the next order and the call number are acquired (#32) and used for calling (#28–#30).

If there is no type of the device to be called having the next order and the call number (No in #31), it is decided whether there is a person to be called having the next order (#33). If there is a person to be called having the next order (Yes in #33), the person to be called having the next order is searched and is used for calling after returning to the step #23. The process is repeated until a response is detected (#23–#32). When a response is detected (Yes in #29), the calling is finished. If there is no person to be called having the next order (No in #33), the process ends in the calling failure.

However, since a facsimile is usually set in the lowest order in the priorities of the device to be called, the calling is usually finished when the transmission to the facsimile is completed.

Next, a concrete example of the process of the informing system 12 when a failure occurs in the main system 11 will be explained.

In this example, a failure occurs in the main system 11 at 18:15 on Feb. 2, 1998, and the main system 11 stops after displaying the failure division "M9" and the failure code "H03" (#11).

The control device 15 acquires the occurrence of the failure from the operation monitoring device 13 that detected the failure, and obtains the date and the time OCC "9802021815" as the current time from the time monitoring device 17 (#12).

The control device 15 acquires the failure division "M9" and decides the failure contents CON "computer" in accordance with the failure division DIV1 "M" (#13). Moreover, the control device 15 decides the malfunction class CLA "single malfunction" in accordance with the failure division DIV2 "9" (#14).

The control device 15 acquires the failure code COD "H03" (#15) and decides the contents of the flag FLG corresponding to the failure code COD (#16).

Since there is no flag FLG corresponding to the failure code COD (No in #16), the control device 15 searches the operating key table 26 in accordance with the operating key PRA "0" corresponding to the failure code COD and decides "time is not advanced" concerning the advancing time (#19).

Since the time is not advanced (No in #19), "CE" is acquired as the responsible group GRO corresponding to the failure code COD "H03" (#22).

The current time for searching "9802021815" is used for searching the rota 20 of "CE", and "Ono" that is the person to be called having the first order is acquired (#23).

Since the person to be called is an individual (#24), the current time for searching "9802021815" is used for searching the roster 21, and "inside work" that is the duty type DUT of the person to be called is acquired (#25).

The duty type DUT "inside work" of the person to be called "Ono" is used for searching the individual device-to-be-called list 22, and the type of the device to be called having the first order "personal computer" and the call number "111.111.P12" are acquired (#26).

The acquired type of the device to be called having the first order "personal computer" and the call number "111.111.P12" are used for calling (#28).

If there is a response (Yes in #29), the calling is finished. If there is no response (No in #29), the number of calling times is decided (#30).

If the number of the calling times is less than a predetermined value (No in #30), calling is repeated until the number of the calling times reaches the predetermined value (#28–#30). If there is no response after the repeated calling of the predetermined times (Yes in #30), it is decided whether there is a type of the device to be called having the next order and the call number (#31). In this example, it is decided "there is."

Since there is the type of the device to be called having the next order and the call number (Yes in #31), the type of the device to be called having the next order "telephone" and the call number "06-949-TTT2" are obtained (#32) and used for calling (#28–#30). When a response is detected (Yes in #29), the calling is finished.

According to the above-mentioned embodiment, when a failure occurred in the main system 11, the device to be called that is assigned to the time zone is informed, so that an optimum person to be called can be informed quickly.

Since the device that is called is the device that the person desired for the time zone, the informing can be performed directly in the shortest time from the time point when the necessity of the informing is generated, to an optimum person to be called, i.e., the real person to be called toward the optimum device to be called. Thus, unreason and waste of the conventional method in which another person temporarily receives the informing and communicates the real person to be called can be dissolved. In addition, since other person except for the real person to be called cannot receive the informing, a mentally dispeace or an unreason due to a possibility of being called anywhere at anytime can be reduced. Since the person can be informed by a device corresponding to the time, the place and the occasion of the person to be called, a rapid and optimum response can be performed.

During the normal operation of the main system 11, an "urgent representative list" is displayed on the screen of the display device 14, so the operator of the main system 11 can know the responsible person for each time zone correctly in real time. Thus, an operator, a manager or a business chief can observe the process of the business at ease. Even if a malfunction occurs, since the person responsible for the support is displayed specifically, the person can handle the malfunction calmly and can have the idea about the proceeding situation of the counter measures and take care of the post measures of the malfunction.

When a failure occurs in the main system 11, since the "urgent automatic call situation" is displayed on the screen of the display device 14, the situation of contacting with the person responsible for the support can be acquired every moment even in the case of the composite malfunction of hardware and software. Therefore, the operator can be concentrated in reporting to the customer or the boss's expedients or in post means, so that a secondary malfunction can be suppressed as much as possible.

In the failure code list 19, since the time designation is performed using the flag FLG, the time of informing can be designated to be postponed if the failure is not urgent. Thus, the load to the responsible person can be reduced. Such a delicate function reduces nonsense or excessive load to the responsible person and the operator can be eliminated and is friendly.

In this embodiment, the operating key table 26 is provided. If a failure occurs when the remaining time until the exchange of the person to be called is short, the failure time is advanced so as to call the person to be called of the next time zone. Therefore, the unreason in that the person having a short time remaining for work or standby receives a call and the person of the next time zone is not called can be avoided.

In the above-mentioned embodiment, the structure of each list, the contents thereof, the procedure and the contents of the process and the operation, the structure of the entire or a part of the informing system 12 can be modified variously within the scope of the present invention.

Industrial Availability

As explained above, an informing system according to the present invention can direct an appropriate maintenance person in a short time to an apparatus that is in an abnormal state when an abnormal condition occurs in an information processing system, and is useful for operating a large scale information processing system that is used in a facility requiring relative urgency such as a hospital or a computer center.

What is claimed is:

1. An informing system to inform of failure contents using a communication line when a failure occurs in an information processing system, comprising:

an operation monitoring unit to detect an occurrence of the failure in the information processing system and to acquire a failure situation;

a time monitoring unit to acquire a failure time when the failure of the information processing system detected by the operation monitoring unit occurs;

a device-to-be-called list containing types of devices to be called and priorities of call numbers used for calling each person to be called in accordance with the failure situation and the failure time, the devices to be called being prepared for each person to be called;

a list updating unit to update the device-to-be-called list; and a calling unit to search the device-to-be-called list using the failure situation and the failure time as keys and to call by designating a type and a call number of a device to be called.

2. The informing system according to claim 1, further comprising a display device that has a screen to display names of people to be called, priorities of each person, a duty type, type of device to be called that is used for calling each person to be called, the call numbers, and the priorities of the call numbers when the failure occurs during normal operation of the information processing system.

3. The informing system according to claim 2, further comprising a display device that has a screen to display detection information including the failure time, an error name and a target of call, and a call situation including names of the people to be called, priorities of the names, a duty type, a call situation, a time corresponding to the call situation, the type of the device to be called that is used for calling a person to be called and a call number.

4. The informing system according to claim 1, further comprising a display device that has a screen to display detection information including the failure time, an error name and a target of call, and a call situation including names of the people to be called, priorities of the names, a duty type, a call situation, a time corresponding to the call situation, the type of the device to be called that is used for calling a person to be called and a call number.

5. The informing system according to claim 1, further comprising a failure code list having a record of whether calling is performed or not corresponding to a failure code acquired from the failure situation obtained by the operation monitoring unit and designation of call timing, so as to perform calling with reference to the failure code list when a failure occurs.

6. The informing system according to claim 1, further comprising an operating key table having a record of time information for advancing the failure time corresponding to a remaining time until an exchange of a person to be called, wherein the system searches the operating key table using an operating key recorded in a failure code list corresponding to a failure code, defines a time for advancing the failure time and calls a person to be called in accordance with the advanced failure time.

7. An informing system to inform of failure contents using a communication line when a failure occurs in an information processing system, the system comprising;

an operation monitoring unit to detect an occurrence of the failure in the information processing system and to acquire a failure situation;

a time monitoring unit to acquire a failure time when the failure of the information processing system detected by the operation monitoring unit occurs;

a rota having a record of people to be called and priorities of the people to be called corresponding to the failure situation and the failure time;

a roster having a record of duty types of the people to be called corresponding to the failure time;

a device-to-be-called list containing types of devices to be called and priorities of call numbers used for calling each person to be called in accordance with a duty type of each person to be called, the devices to be called being prepared for each person to be called;

a list updating unit to update the rota, the roster and the device-to-be-called list; and calling unit to search the rota, the roster and the device-to-be-called list using the failure situation and the failure time as keys and to call by determining a type of the device to be called and a call number.

8. The informing system according to claim 7, further comprising a display device that has a screen to display names of the people to be called, priorities of each person, a duty type, type of device to be called that is used for calling each person to be called, the call numbers, and the priorities of the call numbers when the failure occurs during normal operation of the information processing system.

9. The informing system according to claim 7, further comprising a display device that has a screen to display detection information including the failure time, an error name and a target of call, and a call situation including names of the people to be called, priorities of the names, a duty type, a call situation, a time corresponding to the call situation, the type of the device to be called that is used for calling a person to be called and a call number.

10. The informing system according to claim 7, further comprising a failure code list having a record of whether calling is performed or not corresponding to a failure code acquired from the failure situation obtained by the operation monitoring unit and designation of call timing, so as to perform calling with reference to the failure code list when a failure occurs.

11. The informing system according to claim 7, further comprising an operating key table having a record of time information for advancing the failure time corresponding to a remaining time until an exchange of a person to be called, wherein the system searches the operating key table using an operating key recorded in a failure code list corresponding to a failure code, defines a time for advancing the failure time and calls a person to be called in accordance with the advanced failure time.

12. An informing system, comprising:

an operation monitoring unit to detect an occurrence and failure situation of a failure in an information processing system;

a time monitoring unit to acquire a failure time when the failure occurs;

a device-to-be-called list containing types of devices corresponding to people to be called, and priorities of all numbers used for calling each person to be called in accordance with the failure situation and the failure time;

a calling unit to search the device-to-be-called list based on the failure situation and the failure time, and to call each person to be called by designating a type and a call number of a corresponding device to be called.

13. An informing method, comprising:

detecting an occurrence and failure situation of a failure in an information processing system;

acquiring a failure time when the failure occurs;

searching device-to-be-called list, containing types of devices corresponding to people to be called and priorities of all numbers used for calling each person to be called, based on the failure situation and failure time;

calling each person to be called and informing of the failure, based on the searching of the device-to-to-be-called list and by designating a type and a call number of a corresponding device to be called.

* * * * *